Patented Aug. 30, 1949

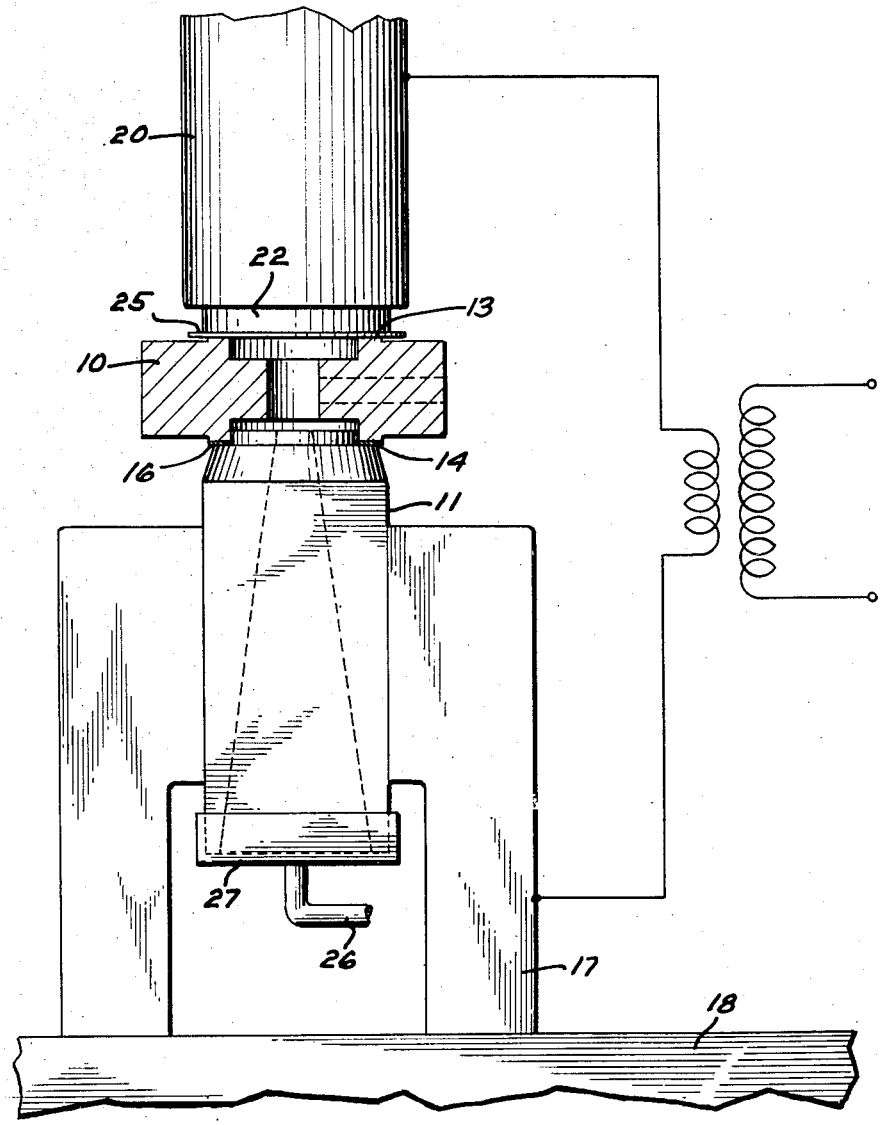

2,480,351

UNITED STATES PATENT OFFICE 2,480,351

ELECTRICAL RESISTANCE BRAZING

Carl M. Anderson, Downers Grove, Ill., assignor to Western Electric Company, Incorporated, New York, N. Y., a corporation of New York Application September 4, 1946, Serial No. 694,748

3 Claims. (Cl. 219—12)

This invention relates to a method of electrical resistance brazing, and more particularly to a method of preventing oxidation of parts during the resistance brazing thereof.

An object of the present invention is to provide an effective and efficient method of resistance brazing and to prevent the oxidation of parts while being brazed.

In one embodiment of the present invention in which two parts are to be resistance brazed to each other and are engaged by separate electrodes, a sheet of molybdenum, which has a high affinity for oxygen, is placed between one of the electrodes and one of the parts to prevent the oxidation of the surface of the part that engages the electrode during the brazing operation.

A more complete understanding of the invention may be had by reference to the following detailed description thereof and to the accompanying drawing showing, somewhat diagrammatically, a brazing apparatus with parts to be brazed in position therein.

In the brazing art where a part is to have other parts brazed to it as, for example, on opposite sides thereof and the parts are bonded together in two or more brazing operations, it is essential in some cases to prevent the oxidation of the parts where they contact the brazing electrodes. This is especially true where one of the electrodes engages the part on a surface that is to be subsequently bonded to another part. Obviously oxidation may be prevented by performing the brazing operation in a chamber of inert or protective gas, but where this is undesirable or impracticable and the brazing is done in an atmosphere containing oxygen, other means must be found to prevent oxidation of the parts. In the present invention this difficulty is overcome by interposing between the part and the electrode a sheet of material having a higher affinity for oxygen than the parts being brazed as, for example, a sheet of molybdenum. Due to the greater affinity of oxygen for molybdenum than for the parts being brazed any oxidation occurring as a result of the brazing operation takes place in the molybdenum sheet and this preserves the surface of the part in a clean condition and free from any contamination.

As one embodiment of the invention in which the process may be practiced the invention will be described in connection with the brazing of a copper anode 10 of an electronic magnetron tube to a copper plated hollow iron pole piece 11. The anode member, which subsequently has a second pole piece bonded thereto opposite the first pole piece, is centrally apertured and provided on opposite sides with raised circular seats 13 and 14 which are adapted to engage and be brazed to annular shoulders on the pole pieces 11. As shown in the drawing, the anode member 10 is seated on the upper end of the pole piece 11 with a ring of silver copper brazing material 16 interposed therebetween. The pole piece 11 is clamped in a vertical position in the lower electrode 17 which is suitably mounted on a platen 18. An upper electrode 20 in alignment with the anode 10 and the pole piece 11 is mounted for vertical reciprocation on a plunger (not shown) and is movable downwardly to engage the anode and apply a predetermined pressure thereto during the brazing operation. The electrodes 17 and 20 are connected to a suitable source of welding current.

Since the anode member 10 is of copper and the pole piece 11 is of copper plated iron it is necessary to provide a resistance or heat producing element 22 between the electrode 20 and the anode 10. The element 22 is a carbon disc copper plated on its exterior surface to minimize arcing between itself and the members it contacts. During the brazing operation heat will be generated at the carbon element 22, which heat will be conducted to the anode 10 to bring it up to a brazing temperature at the same time that the upper portion of the pole piece 11 attains a brazing temperature. When the parts 10 and 11 have attained the brazing temperature the ring 16 of brazing material will fuse and effect a bonding of the parts 10 and 11 at their meeting surfaces.

With the carbon element 22 engaging the surface 13 of the anode member 10 during the brazing operation oxidation and discoloration of the surface 13 results from the passage of current and heat therethrough. Since the surface 13 subsequently has brazed to it a pole piece similar to the pole piece 11, it is essential that the surface 13 be maintained in a clean condition.

To avoid oxidation of the surface 13 and to insure its being maintained clean during the brazing operation, a sheet of molybdenum 25 is placed between the carbon element and the surface 13 of the anode member 10. Should the heat produced at the juncture of the anode 10 and the electrode 20 cause the oxygen to react with a metal, the oxygen will combine with the molybdenum plate 25 because of its relatively high affinity for oxygen as compared with copper. In addition to its preventing oxidation of the surface 13 the molybdenum sheet 25 acts to prevent any carbon particles that might become separated from the element 22 from entering and contaminating the interior of the anode 10.

To maintain the internal surfaces of the parts 10 and 11 free from the effects of oxidation a protective gas may be passed therethrough from a supply line 26 attached to a cover plate 27 on the lower end of the pole piece 11.

From the foregoing description of the invention it will be apparent that in the practice of the method as herein disclosed the surface of the part contacting the molybdenum sheet will be maintained in a clean condition, free from oxidation.

What is claimed is:

1. The process of brazing metal parts which comprises positioning metal parts in juxtaposition for brazing with brazing material therebetween, placing a separate sheet of molybdenum over and in contact with one of said parts to keep it clean from oxidation, and then applying a separate heating means to said sheet to conduct heat substantially only through the molybdenum sheet to the parts to braze them and to prevent oxidation of said parts during the brazing operation.

2. The process of brazing metal parts which comprises placing the parts with interposed brazing material between a clamping electrode and a heating electrode to pass a current through them, clamping one of the parts in one of the electrodes, placing a separate sheet of molybdenum over and in contact with another of said parts, and then bringing the heating electrode into contact only with the sheet of molybdenum to conduct heat substantially only therethrough to braze the parts and protect them from contamination from the heating electrode.

3. The process of brazing two metal parts together which comprises clamping one part in an electrode, placing a brazing material on a portion of the clamped part, positioning a second part to be brazed on the brazing material, placing a separate sheet of molybdenum over and in contact with the second part, then bringing a heating electrode into contact only with the sheet of molybdenum, and passing current through the electrodes, sheet and parts to conduct heat from the heating electrode through the said sheet to the parts to braze them together and protect them from contamination by the heating electrode.

CARL M. ANDERSON.

REFERENCES CITED

The following references are of record in the file of this patent:

UNITED STATES PATENTS

| Number | Name | Date |
|---|---|---|
| 1,176,614 | Stanley | Mar. 21, 1916 |
| 2,253,375 | Henninger | Aug. 19, 1941 |
| 2,346,088 | Shobert | Apr. 4, 1944 |

OTHER REFERENCES

Welding Handbook, 1942, pages 396 and 859. American Welding Society, 33 West 39th Street, New York, New York.